(12) United States Patent
Youn et al.

(10) Patent No.: US 7,137,790 B2
(45) Date of Patent: Nov. 21, 2006

(54) SEALING STRUCTURE OF PUMP

(75) Inventors: Chi Wook Youn, Seoul (KR); Tae Yual Yang, Seongnam-si (KR)

(73) Assignee: Keumjung Industrial Co., Ltd., Inchun-Si (KR)

( * ) Notice: Subject to any disclaimer, the term of this patent is extended or adjusted under 35 U.S.C. 154(b) by 0 days.

(21) Appl. No.: 10/486,825

(22) PCT Filed: Jun. 30, 2003

(86) PCT No.: PCT/KR03/01282

§ 371 (c)(1),
(2), (4) Date: Feb. 19, 2004

(87) PCT Pub. No.: WO2004/016978

PCT Pub. Date: Feb. 26, 2004

(65) Prior Publication Data

US 2004/0197207 A1  Oct. 7, 2004

(30) Foreign Application Priority Data

Aug. 14, 2002  (KR) ............... 10-2002-0048096

(51) Int. Cl.
*F04B 17/00*  (2006.01)
*F16L 5/02*  (2006.01)

(52) U.S. Cl. ................... 417/360; 277/607; 277/608

(58) Field of Classification Search ........... 417/360; 277/607, 608, 609, 618
See application file for complete search history.

(56) References Cited

U.S. PATENT DOCUMENTS

| | | | |
|---|---|---|---|
| 3,880,553 A * | 4/1975 | Wolford et al. | 417/360 |
| 3,938,545 A * | 2/1976 | Nagy et al. | 137/363 |
| 4,345,854 A | 8/1982 | Valantin | |
| 4,392,790 A | 7/1983 | Shibata et al. | |
| 4,438,960 A * | 3/1984 | Carroll et al. | 285/367 |
| 5,382,057 A | 1/1995 | Richter | |

FOREIGN PATENT DOCUMENTS

JP  06185492 A *  7/1994

* cited by examiner

*Primary Examiner*—Charles G. Freay
(74) *Attorney, Agent, or Firm*—Shlesinger, Arkwright & Garvey LLP (57) ABSTRACT

A sealing structure for an underwater pump comprises an elbow pipe having a first flange formed at an inlet thereof with an inclined inner surface; an underwater pump having a second flange formed at an outlet thereof; a guide member attached to the second flange and disposed between guide bars vertically mounted under the water so that the guide member is vertically movable along the guide bars, wherein the guide member comprises an annular hollow portion disposed between the outlet and the inlet; and a gasket mounted to the annular hollow portion, wherein the gasket comprises a tapered front portion with an inclined surface that makes close contact with the inclined inner surface of the first flange.

5 Claims, 7 Drawing Sheets

PRIOR ART

SEALING STRUCTURE OF PUMP

FIELD OF THE INVENTION

The present invention relates to an underwater pump, and more particularly to a sealing structure of an underwater pump for preventing a water leakage between the under water pump and an elbow pipe.

BACKGROUND OF THE INVENTION

Figure 1:
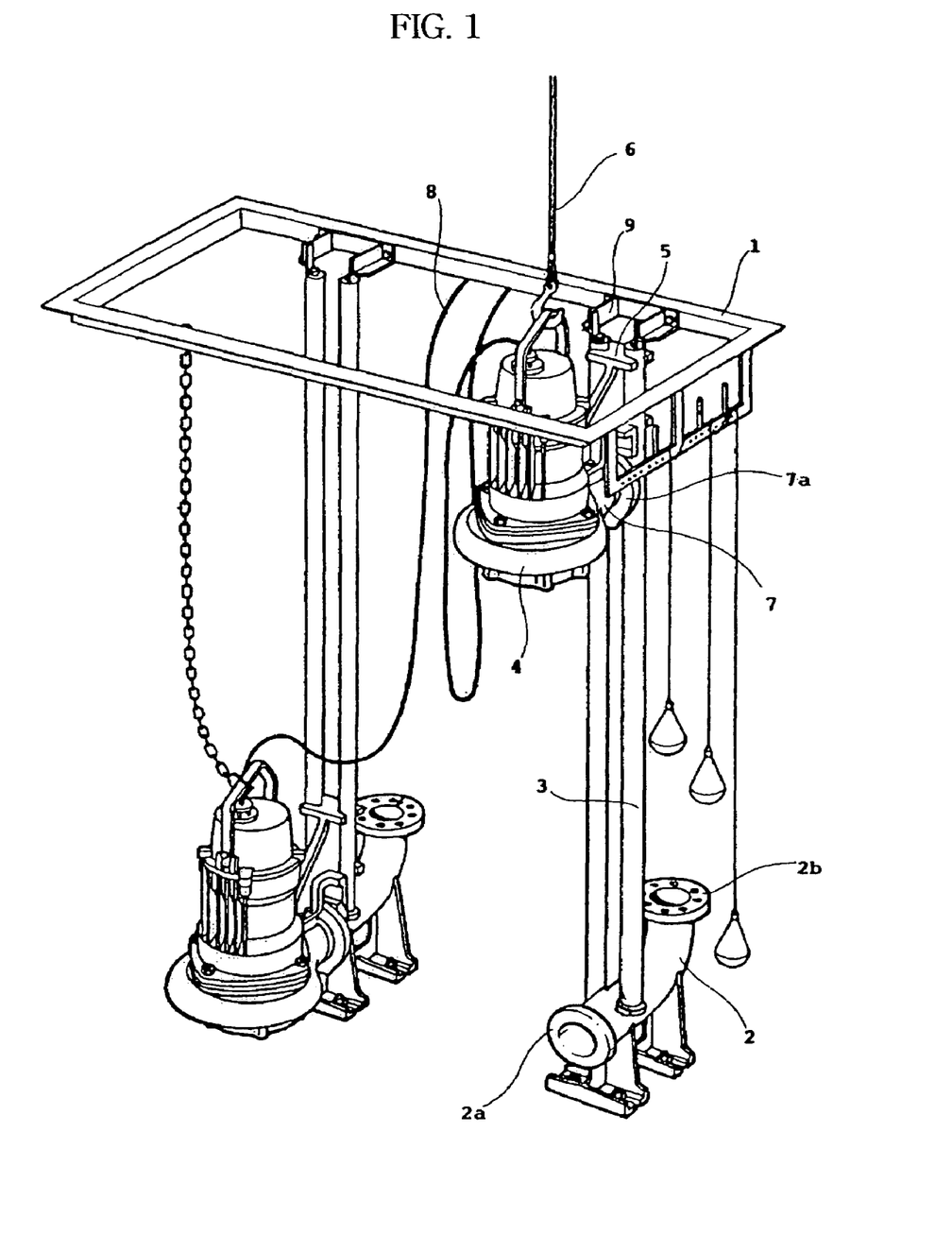
FIG. 1 is a perspective view showing a structure in which a conventional underwater pump is installed.

FIG. 1 is a perspective view showing a structure in which a conventional underwater pump is installed. As shown in FIG. 1, a supporting frame 1 is mounted to the top of a water tank (not shown), and an elbow pipe 2 is mounted on the bottom of the water tank. To the supporting frame 1 is attached a bracket 9, by which the upper ends of a pair of guide bars 3 are fixed to the supporting frame 1. The lower ends of the guide bars 3 are attached to the elbow pipe 2. At one side of an underwater pump 4 is connected a guide member 5. When the underwater pump 4 is to be installed under the water in the water tank, a pulling rope 6, which is connected to the underwater pump 4, is moved down by means of a hoist (not shown). As the pulling rope 6 is moved down, the underwater pump 4 moves down due to its own weight while being guided along the guide bars 3. After the underwater pump 4 moves down along the guide bars 3, a flange 7a formed at an outlet 7 of the underwater pump 4 is connected to another flange 2a formed at an inlet of the elbow pipe 2. As a result, the outlet 7 of the underwater pump 4 communicates with the elbow pipe 2.

When the underwater pump 4 is energized through a power line 8, the underwater pump 4 is operated. When the underwater pump 4 is operated, the water in the water tank is discharged to the outside via the outlet 7 of the underwater pump 4, the elbow pipe 2, and a discharging pipe (not shown) connected to a flange 2b formed at an outlet of the elbow pipe 2.

Figure 2:
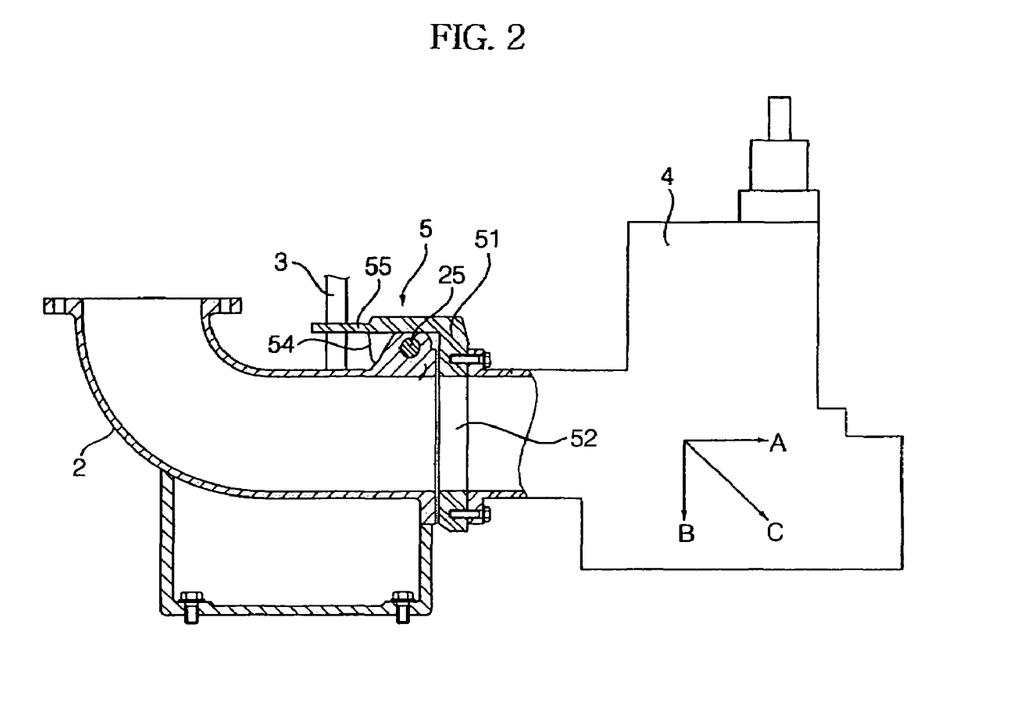
FIG. 2 is a front view, partially in section, showing connection of a conventional underwater pump and an elbow pipe.

FIG. 2 is a front view, partially in section, showing connection of a conventional underwater pump and an elbow pipe.

As shown in FIG. 2, to the upper side of the inlet of the elbow pipe 2 is fixed a supporting bar 25 while the right and left ends of the supporting bar 25 are extended outwardly. To the flange 7a formed at the outlet 7 of the underwater pump 4 is connected the guide member 5.

The guide member 5 comprises: an annular hollow part 51 having a central opening 52 formed therethrough for communicating the outlet 7 of the underwater pump 4 and the inlet of the elbow pipe 2 to each other; a projection part 54 having an inclined surface making contact with the inner side of the supporting bar 25; and a guide part 55 disposed between the guide bars 3 in such a manner that the guide part 55 is vertically movable along the guide bars 3. The outer side of the annular hollow part 51 of the guide member 5 is vertically disposed. Similarly, the outer side of the flange 2a formed at then inlet of the elbow pipe 2 is vertically disposed.

In the case of the above-mentioned connection of the conventional underwater pump 4 and the elbow pipe 2, however, a reaction force (A) is applied to the underwater pump 4 in the direction opposite to the elbow pipe 2, and a pressure (B) caused by the sum of the weight of the underwater pump 4 and the pressure of the water in the water tank is also applied to the underwater pump 4 in the lower direction of the underwater pump 4 when the underwater pump 4 is operated. Consequently, the underwater pump 4 and the guide member 5 are upwardly rotated counterclockwise about the supporting bar 25 by means of a resultant force (C), which is the sum of the reaction force (A) and the pressure (B). As a result, there is a gap created between the lower side of the annular hollow part 51 and the lower side of the flange 2a formed at the inlet of the elbow pipe 2, and water leaks through the gap.

DISCLOSURE OF THE INVENTION

Therefore, the present invention has been made in view of the above problems, and it is an object of the present invention to provide a sealing structure of an underwater pump for preventing a water leakage between the under water pump and an elbow pipe.

In accordance with the present invention, the above and other objects can be accomplished by the provision of a sealing structure of an underwater pump, comprising: an elbow pipe having a flange formed at an inlet thereof; an underwater pump having a flange formed at an outlet thereof; a guide member attached to the flange formed at the outlet of the underwater pump, the guide member being disposed between guide bars vertically mounted under the water so that the guide member is vertically movable along the guide bars, the guide member comprising an annular hollow part disposed between the outlet of the underwater pump and the elbow pipe; and a gasket mounted to the annular hollow part of the guide member, the gasket comprising a front part making close contact with an inner surface of the flange formed at the inlet of the elbow pipe.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, a preferred embodiment of the present invention will be described in detail with reference to the accompanying drawings.

Figure 3:
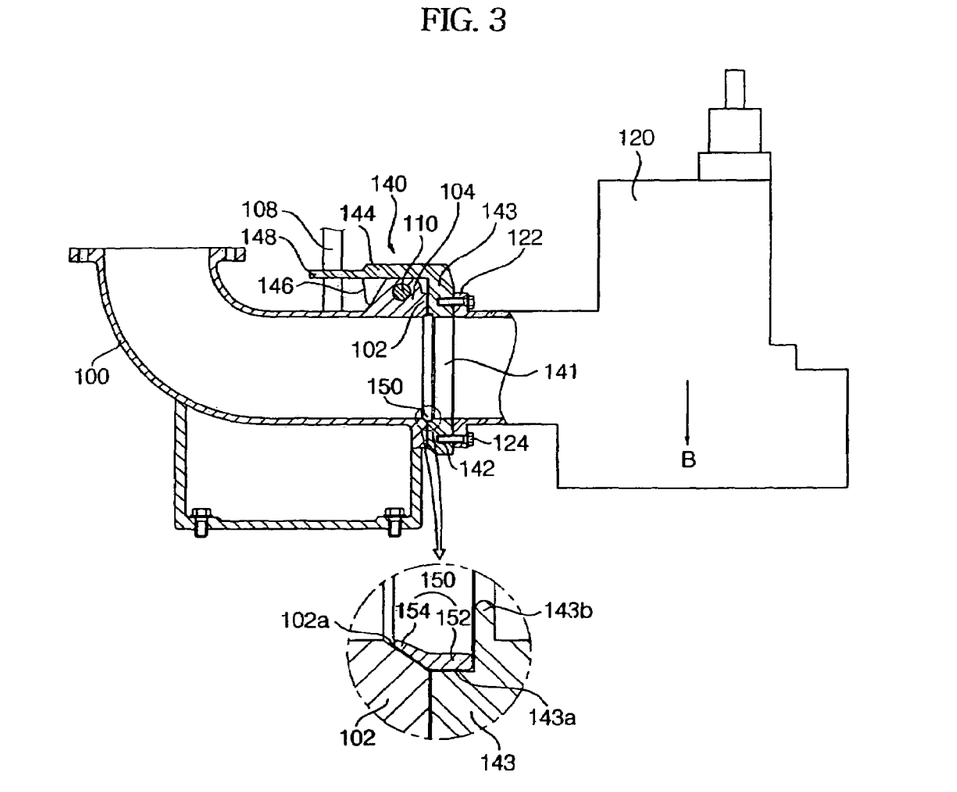
FIG. 3 is a front view, partially in section, showing connection of an underwater pump according to a preferred embodiment of the present invention and an elbow pipe when the underwater pump is not operated.
Figure 4:
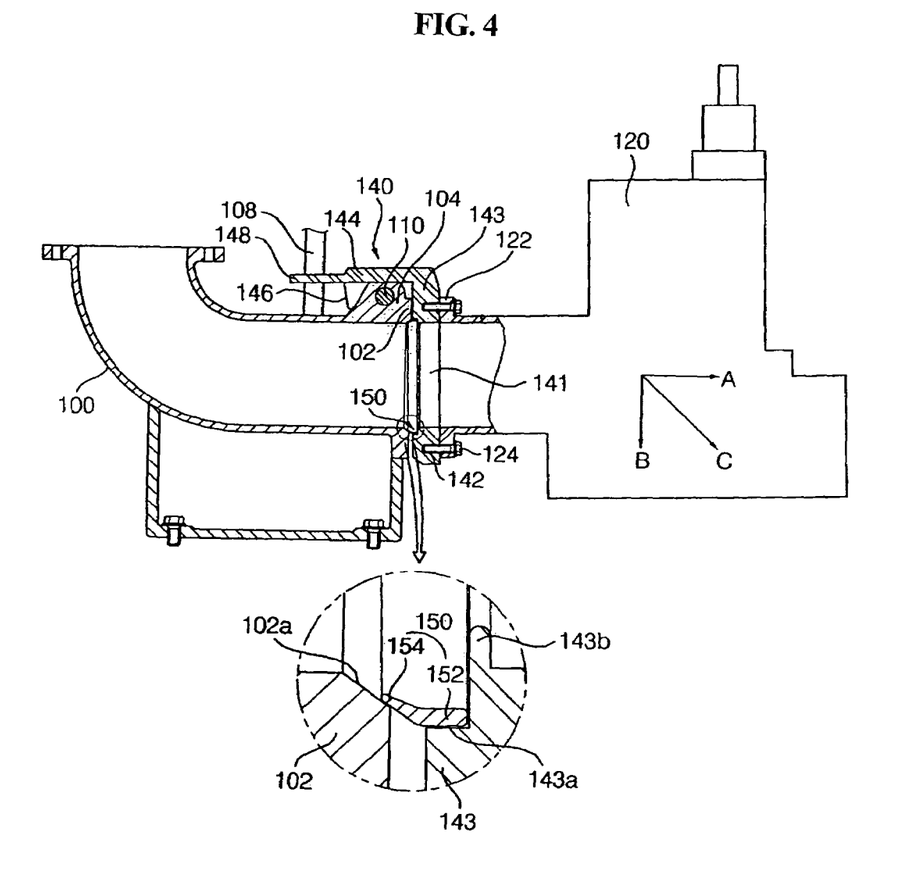
FIG. 4 is a front view, partially in section, showing connection of an underwater pump according to a preferred embodiment of the present invention and an elbow pipe when the underwater pump is operated.
Figure 5:
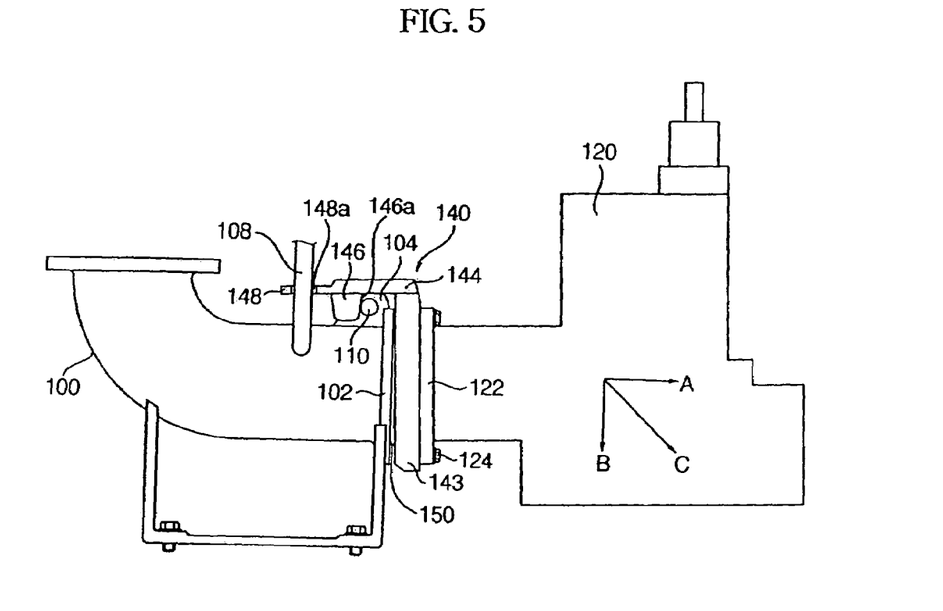
FIG. 5 is a front view showing connection of an underwater pump according to a preferred embodiment of the present invention and an elbow pipe when the underwater pump is operated.
Figure 6:
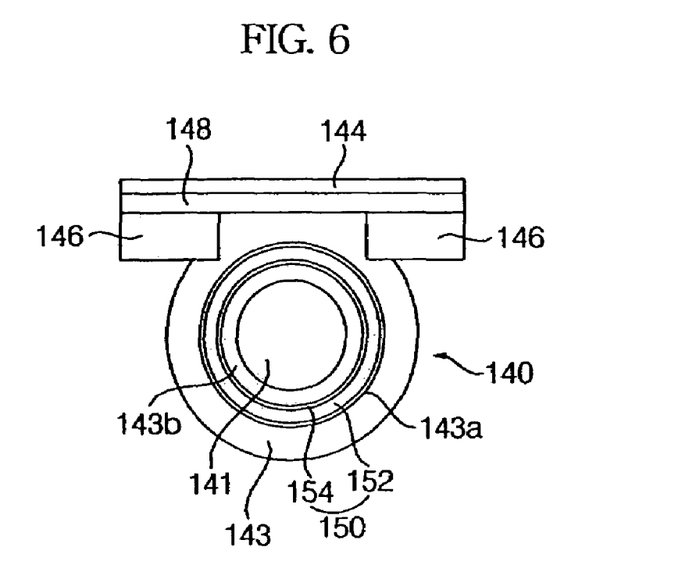
FIG. 6 is a left side view showing a gasket mounted to a guide member of the present invention.
Figure 7:
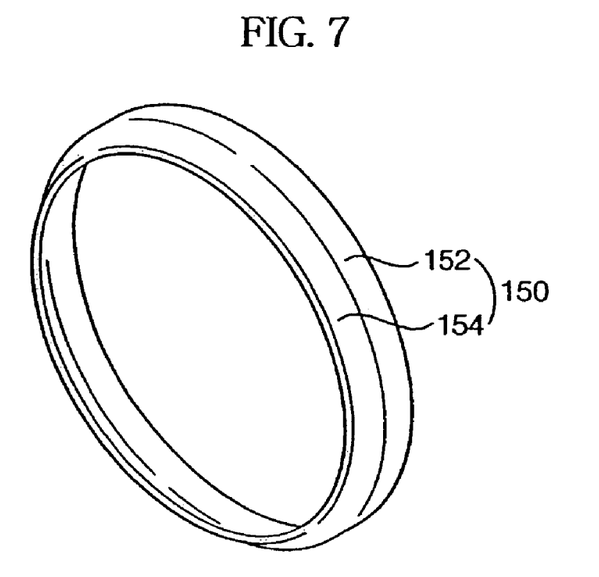
FIG. 7 is a perspective view showing a gasket of the present invention.

FIG. 3 is a front view, partially in section, showing connection of an underwater pump according to a preferred embodiment of the present invention and an elbow pipe when the underwater pump is not operated, FIG. 4 is a front view, partially in section, showing connection of an underwater pump according to a preferred embodiment of the present invention and an elbow pipe when the underwater pump is operated, FIG. 5 is a front view showing connection of an underwater pump according to a preferred embodiment of the present invention and an elbow pipe when the underwater pump is operated, FIG. 6 is a left side view showing a gasket mounted to a guide member of the present invention, and FIG. 7 is a perspective view showing a gasket of the present invention.

As shown in FIGS. 3 to 5, a sealing structure of the underwater pump according to the preferred embodiment of the present invention comprises: an elbow pipe 100 fixedly mounted on the bottom of a water tank (not shown); an underwater pump 120 for delivering the water in the water tank to the elbow pipe 100; a guide member 140 attached to an outlet of the underwater pump 120 for connecting the underwater pump 120 to the elbow pipe 100; and a gasket 150 for blocking a gap created between the elbow pipe 100 and the guide member 140 to prevent a water leakage when the underwater pump 120 is operated.

The elbow pipe 100 has a flange 102 formed at an inlet thereof. The flange 102 is provided at the upper part thereof with a projection part 104. In the projection part 104 is fitted a supporting bar 110 in such a manner that both ends of the supporting bar 110 are extended outwardly from the projection part 104. To both sides of the elbow pipe 100 are vertically mounted a pair of guide bars 108, along which the guide member 140 is guided.

The flange 102 formed at the inlet of the elbow pipe 100 has an inclined inner surface 102a, which makes contact with a front part 154 of the gasket 150.

The underwater pump 120 has a flange 122 formed at the outlet thereof. The guide member 140 is attached to the flange 122 by means of bolts 124.

As shown in FIGS. 5 and 6, the guide member 140 comprises: an annular hollow part 143 having a central opening 141 formed therethrough and engagement holes 142 formed at the edge thereof, the bolts 124 being engaged into the engagement holes 142 so that the annular hollow part 143 is attached to the flange 122 of the underwater pump 120; a connection part 144 horizontally extended from the upper side of the annular hollow part 143 toward the guide bars 108; a pair of projection parts 146 downwardly protruded from the right and left side of the connection part 144, respectively, while the projection parts are spaced apart from each other, each of the projection parts 146 having an inclined inner surface 146a making contact with the supporting bar 110; a guide part 148 horizontally extended from the connection part 144 and having a groove 148a formed at either side thereof so that the guide part 148 is interposed between the guide bars 108 while there are provided gaps between the grooves 148a and the corresponding guide bars 108, respectively.

The annular hollow part 143 has a stepped insertion groove 143a, in which the gasket 150 is inserted, as shown in FIG. 3. The annular hollow part 143 also has a ring-shaped separation-preventing projection 143b protruded toward the center of the central opening 141 of the annular hollow part 143 for preventing separation of the gasket 150 inserted in the insertion groove 143a.

As shown in FIGS. 3 and 7, the gasket 150 is formed in the shape of a cylinder. The gasket 150 has a front part 154 making contact with the flange 102 formed at the inlet of the elbow pipe 100 and a rear part 152 inserted in the insertion groove 143a of the annular hollow part 143. The thickness of the front part 154 of the gasket 150 is smaller than that of the rear part 152 of the gasket 150. The front part 154 is tapered, as shown in FIGS. 3, 4 and 7.

The front part 154 of the gasket 150, which makes contact with the flange 102 formed at the inlet of the elbow pipe 100, is inclined so that the front part 154 of the gasket 150 makes wide contact with the inclined surface 102a of the flange 102 formed at the inlet of the elbow pipe 100.

The operation of the present invention with the above-stated construction will now be described.

The guide part 148 of the guide member 140 is interposed between the guide bars 108, and the guide member 140 is fixed to the flange 122 of the underwater pump 120 by means of the bolts 124. When the underwater pump 120 is moved down, the annular hollow part 143 of the guide member 140 moves forward to the flange 102 formed at the inlet of the elbow pipe 100 while the inclined surface 146a of the projection part 146 of the guide member 140 makes contact with the supporting bar 110, and then the outer side of the annular hollow part 143 makes close contact with the flange 102 formed at the inlet of the elbow pipe 100.

At this time, the outer circumference of the front part 154 of the gasket 150 makes close contact with the inclined surface 102a of the flange 102 formed at the inlet of the elbow pipe 100 while the rear part 152 of the gasket 150 is inserted in the insertion groove 143a of the annular hollow part 143, whereby sealing is accomplished between the annular hollow part 143 of the guide member 140 and the flange 102 formed at the inlet of the elbow pipe 100.

A pressure (B) caused by the sum of the pressure of the water in the water tank and the weight of the underwater pump 120 is applied to the underwater pump 120 while the projection part 146 of the guide member 140 makes contact with the supporting bar 110. Consequently, the underwater pump 120 is connected to the elbow pipe 100 while the annular hollow part 143 of the guide member 140 is interposed between the underwater pump 120 and the elbow pipe 100.

When the underwater pump 120 installed as mentioned above is operated, the water in the water tank is discharged to the outside via the outlet 7 of the underwater pump 120, the annular hollow part 143, the gasket 150, the elbow pipe 100, and a discharging pipe (not shown) connected to an outlet of the elbow pipe 100.

At this time, a resultant force (C), which is the sum of a reaction force (A) caused by the discharge of the water and a pressure (B) caused by the weight of the underwater pump 120 and the pressure of the water in the water tank, is applied to the underwater pump 120, as shown in FIGS. 4 and 5. Consequently, the underwater pump 120 is rotated counterclockwise about the supporting bar 110. The guide member 140 is also rotated together with the underwater pump 120. As a result, there is a gap created between the annular hollow part 143 and the flange 102 formed at the inlet of the elbow pipe 100. When the annular hollow part 143 is moved away from the flange 102 formed at the inlet of the elbow pipe 100, the front part 154 of the gasket 150, which is in contact with the inclined surface 102a of the flange 102 formed at the inlet of the elbow pipe 100, slides down along the inclined surface 102a of the flange 102 formed at the inlet of the elbow pipe 100 to block the gap created between the annular hollow part 143 and the flange 102 formed at the inlet of the elbow pipe 100. Consequently, a water leakage is prevented between the annular hollow part 143 of the guide member 140 and the flange 102 formed at the inlet of the elbow pipe 100.

When the operation of the underwater pump 120 is stopped, the underwater pump 120 is rotated downward about the supporting bar 110 by means of the pressure (B) caused by the sum of the weight of the underwater pump 120 and the pressure of the water in the water tank. Consequently, the annular hollow part 143 of the guide member 140 makes close contact with the flange 102 formed at the inlet of the elbow pipe 100, and the gasket 150, which is blocking the gap created between the annular hollow part 143 and the flange 102 formed at the inlet of the elbow pipe 100, returns to its original position.

INDUSTRIAL APPLICABILITY

As apparent from the above description, the present invention provides a sealing structure of an underwater pump wherein a gasket is mounted to an annular hollow part of a guide member disposed between an underwater pump and an elbow pipe, and the gasket makes close contact with an inclined inner surface of a flange formed at an inlet of the elbow pipe, whereby a water leakage can be prevented between the annular hollow part of the guide member and the flange formed at the inlet of the elbow pipe.

The annular hollow part has a stepped insertion groove, in which the gasket is inserted, whereby the gasket can be easily mounted to the annular hollow part of the guide member.

The annular hollow part also has a ring-shaped separation-preventing projection protruded toward the center of a central opening of the annular hollow part for preventing separation of the gasket inserted in the insertion groove, whereby separation of the gasket from the annular hollow part can be effectively prevented.

Furthermore, a front part of the gasket and an inner surface of the flange formed at the inlet of the elbow pipe, which makes contact with the front part of the gasket, are inclined, whereby the gasket can make wide contact with the flange formed at the inlet of the elbow pipe when the underwater pump is installed, and the gasket can easily return to its original position when the operation of the underwater pump is stopped.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sealing structure for an underwater pump, comprising:
   an elbow pipe having a first flange formed at an inlet thereof, said first flange including an inclined inner surface;
   an underwater pump having a second flange formed at an outlet thereof;
   a guide member attached to said second flange, said guide member being disposed between guide bars vertically mounted under the water so that said guide member is vertically movable along said guide bars, said guide member comprising an annular hollow portion disposed between said outlet and said inlet; and
   a gasket mounted to said annular hollow portion, said gasket comprising a tapered front portion having an inclined surface that makes close contact with said inclined inner surface of said first flange.

2. The sealing structure as in claim 1, wherein said annular hollow portion of said guide member has a stepped insertion groove, and said gasket is inserted in said stepped insertion groove.

3. The sealing structure as in claim 2, wherein said annular hollow portion of said guide member has a separation-preventing projection protruding toward a center of said annular hollow portion to prevent separation of said gasket inserted in said stepped insertion groove.

4. The sealing structure as in claim 2, wherein said gasket further comprises a rear portion inserted in said stepped insertion groove.

5. The sealing structure as in claim 1, wherein said elbow pipe has a supporting bar fitted in an upper part of said inlet while both ends of said supporting bar are extended outwardly from said elbow pipe, and said guide member further comprises projection portions having inclined inner surfaces making contact with both ends of said supporting bar, respectively.

* * * * *